Nov. 11, 1969  H. M. BRAZENER ETAL  3,477,893
METHOD AND APPARATUS FOR USE IN MAKING HONEYCOMB CORES
Filed June 27, 1967  4 Sheets-Sheet 1

Harry M. Brazener
Robert W. Newman
INVENTORS

Nov. 11, 1969   H. M. BRAZENER ETAL   3,477,893
METHOD AND APPARATUS FOR USE IN MAKING HONEYCOMB CORES
Filed June 27, 1967   4 Sheets-Sheet 2

Harry M. Brazener
Robert W. Newman
INVENTORS

BY
Attorneys

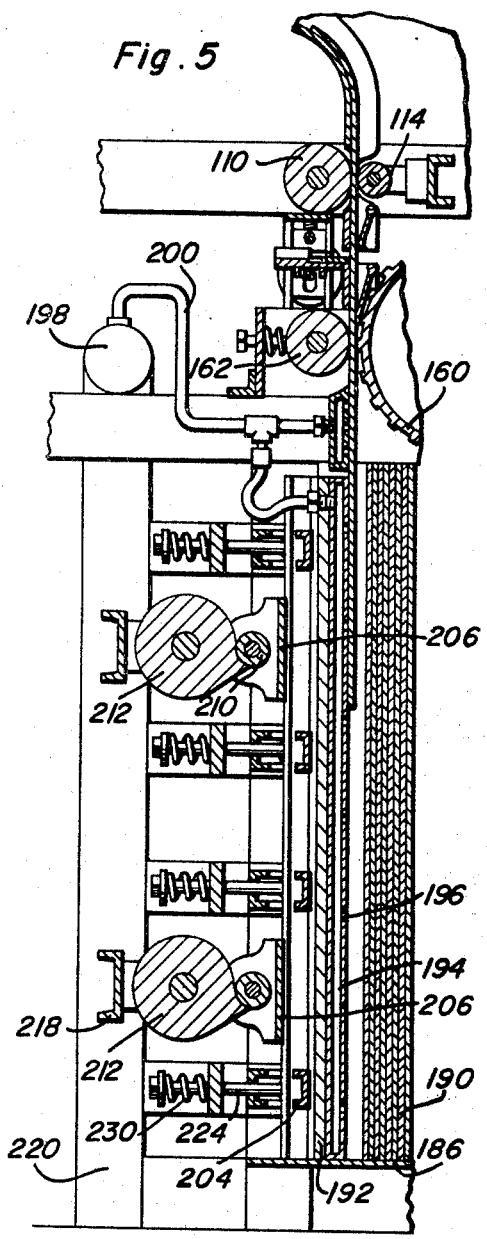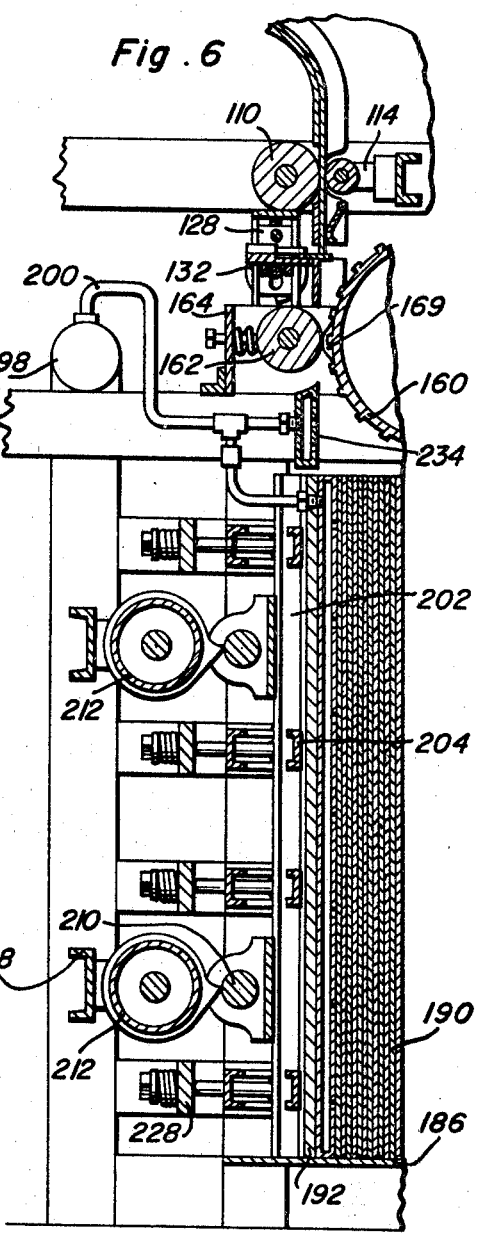

Harry M. Brazener
Robert W. Newman
INVENTORS

United States Patent Office 3,477,893
Patented Nov. 11, 1969

3,477,893
METHOD AND APPARATUS FOR USE IN MAKING HONEYCOMB CORES
Harry M. Brazener, Bay Harbor Island, and Robert W. Newman, Hialeah, Fla., assignors, by mesne assignments, to Inventions, Inc., a corporation of Florida
Filed June 27, 1967, Ser. No. 649,275
Int. Cl. B31d 3/02
U.S. Cl. 156—197       6 Claims

ABSTRACT OF THE DISCLOSURE

An apparatus for cutting a continuous strip of constant width into a plurality of strips of equal length, automatically removing any scrap pieces or pieces of unequal length, applying transverse lines of adhesive to the strip and depositing the strips into a press to bond the strips together along the strips of adhesive to enable subsequent expansion of the assembly to be employed with sandwich panels to form a honeycomb core. The method or sequence of operation as well as the apparatus includes a vacuum face plate employed in the press for enabling free fall of the strips into the press with the face plate slowing down the rate of descent of the strips. Also, the point of application of the adhesive areas to the strips will be varied to provide staggered areas of connection between the strips to enable expansion thereof to form the honeycomb core.

---

The present invention generally relates to a method and apparatus for use in making honeycomb cores of the type having parallel skins spaced apart by a core of honeycomb material, and more particularly relates to an apparatus and method of forming the core into a condition such that it is ready to be expanded to form a honeycomb structure.

An object of the invention is to provide a method of forming a honeycomb core which includes the steps of cutting a continuous web of constant width material into a plurality of strips of equal length, eliminating any scraps, applying a bonding material at uniformly spaced areas of one surface of the strip with the areas on sequential strips being staggered and then pressing the strips together so that the bonding material will bond the strips together at staggered areas to form an unexpanded core which is ready to be expanded to form a honeycomb core.

Another object of the present invention is to provide an apparatus for cutting a continuous web of constant width material into a plurality of equal length strips, eliminating or removing scrap strips, applying adhesive at spaced points on sequential strips with the apparatus automatically orienting the adhesive areas in staggered relation to each other on subsequent strips, permitting the strips to free fall into a press, arresting or decelerating the strips by employing a vacuum force on the face plate of the press and subsequently pressing the strips together to bond the strips to each other at staggered points to enable subsequent expansion to form a honeycomb core.

A still further object of the invention is to provide an apparatus for use in making a honeycomb core which is simple in construction, efficient in operation and relatively inexpensive to manufacture and operate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a transverse sectional view of the press mechanism illustrating the cam structure for reciprocating the face plate thereof;

FIGURE 4 is a sectional view similar to FIGURE 3 but illustrating the structure through certain of the return springs;

FIGURE 5 is a vertical sectional view of the press illustrating the face plate thereof in retracted position for receiving a strip in a free fall condition;

FIGURE 6 is a sectional view similar to FIGURE 5 but illustrating the face plate in the operative position for pressing the strips together;

FIGURE 7 is a schematic perspective view illustrating the relationship of the structural features of the invention;

Figure 1:
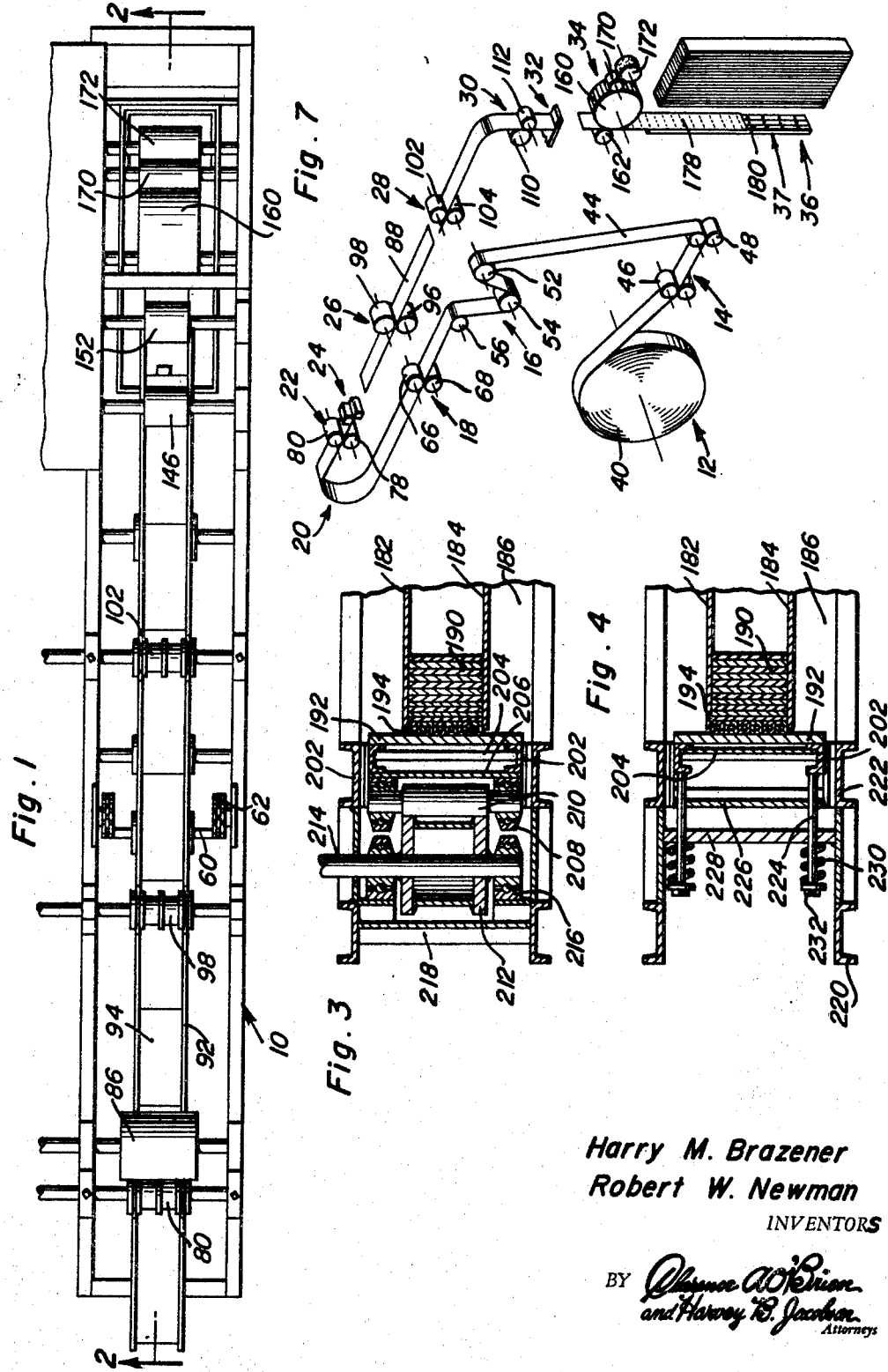
FIGURE 1 is a top plan view of the apparatus of the present invention.
Figure 2:
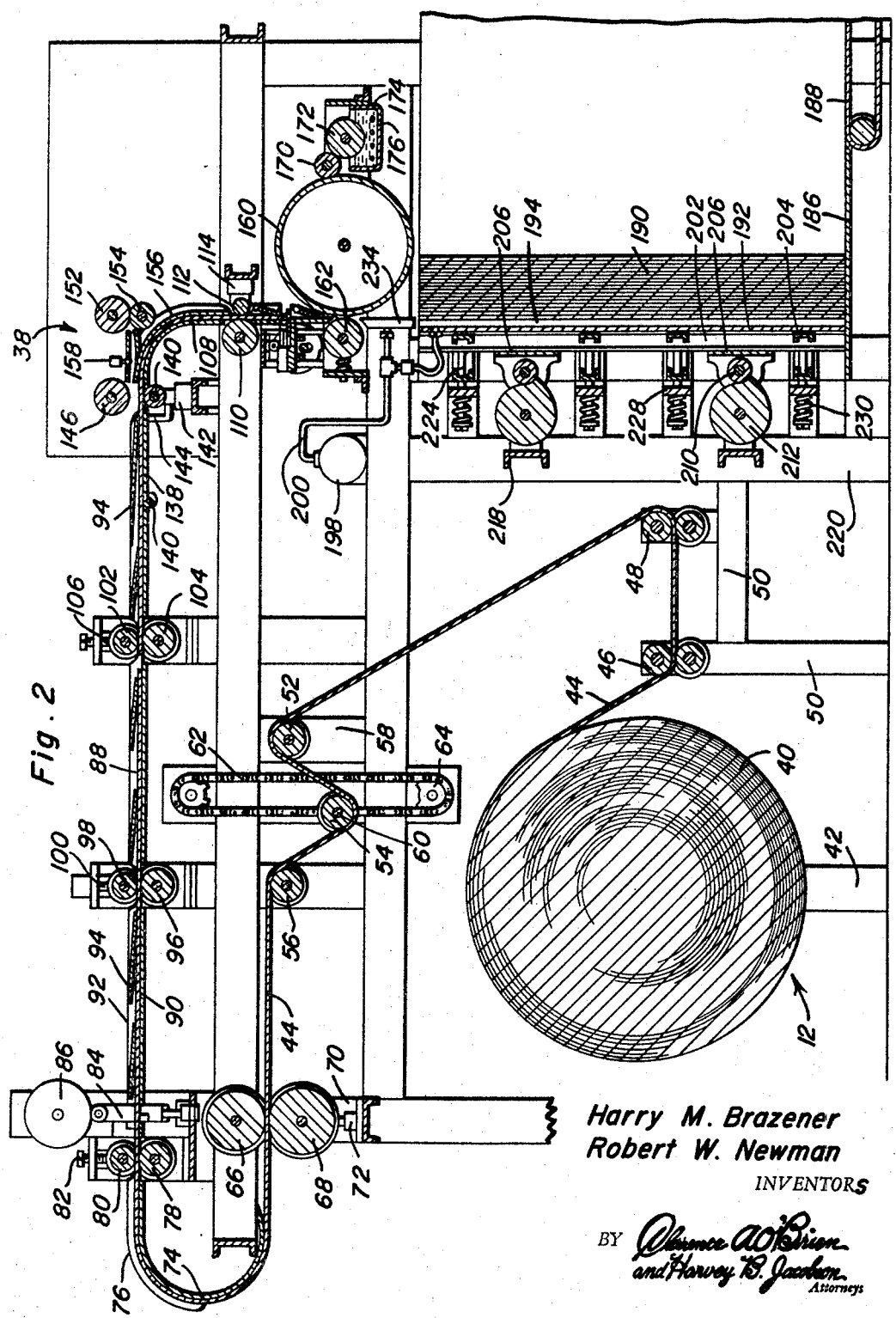
FIGURE 2 is a longitudinal sectional view taken substantially upon a plane passing along section line 2—2 of FIGURE 1 illustrating the association of the structural components of the apparatus.

Referring now specifically to the drawings, the apparatus constituting the present invention is generally designated by the numeral 10 and in referring specifically to FIGURES 2 and 7, there is provided a supply station 12, a straightening and splicing station 14, a tension control station 16, a primary feed station 18, a loop area 20, a shear feed station 22, a shear station 24, a shear feed and sensing station for double thickness 26, a secondary feed station 28, a kicker station 30, a stop station 32, an adhesive applicator station 34 and a press station 36. Above the kicker station 30 as illustrated in FIGURE 2, there is provided a scrap throw-out station 38.

At the supply station 12, there is provided a spool 40 rotatably journalled on a suitable support 42 and which has wound thereon a continuous web 44 of material from which the honeycomb core is to be formed. The web 44 of material has been slit to have a constant width corresponding to the required width as established by the thickness of the honeycomb core to be formed. For example, if the honeycomb core panel is to have a width of three inches, then the web 44 will be slit to provide a constant width of three inches. By so slitting the web, the width of the honeycomb core panel form will be constant and the strips forming the honeycomb core are more easily kept in alignment and the finished structure will require very little or no planing or sanding. The web material may be any of several well-known materials such as impregnated paper, plastic, and ductile metals, such as light gauge aluminum, steel, copper and the like.

The splicing and straightening station 14 includes two spaced pair of rollers 46 and 48. The web 44 is fed into the nip of the rollers 46 with the second pair of rollers 48 employed to reduce the curl in the strip or web 44. The rollers 46 and 48 are supported on suitable frames 50 and the lower roller of each pair of rollers 46 and 48 may be flanged rollers.

The web 44 then passes upwardly to the tension control station where it passes over a guide roller 52. The web 44 then passes under the floating roller 54 and then over a second guide roller 56. The guide rollers 52 and 56 are stationarily rotatably supported on supporting frame structures 58 while the floating or dancing roller 54 is rotatably journalled by an axle 60 which has the ends thereof supported by an endless chain 62 which is vertically disposed and which is entrained over vertically spaced sprockets 64 as illustrated in FIGURE 2. The ends of the axle or shaft 60 on which the roller 54 is supported may be properly guided and the floating roller 54 controls the pay-off speed and the tension in the strip or web 44 by virtue of a suitable control rheostat which also may be used in case of a break or separation in the strip or web 44 to stop pay-off of the web and operate the scrap throw-out to clear the apparatus of imperfect strip sections.

From the guide roller 56, the web or strip 44 passes through the primary feed station 18 which includes a pair of primary feed rollers 66 and 68 journalled on a suitable frame structure 70 with the speed of the rollers 66 and 68 being variable as required and remaining constant under normal operating conditions. Also, the pressure exerted by the rollers 66 and 68 may be varied by any suitable apparatus 72 for elevating the lower roller 68.

From the primary feed station 18, the web or strip 44 passes over the loop area 20 which is in the form of a curved skid surface 74 which engages the inner surface of the web or strip 44 and the portion of the surface 74 disposed above a center thereof is provided with upstanding guide flanges 76. The loop area guides the web and provides for lag thereof during the shear time.

From the loop area 20, the web or strip 44 enters the shear feed station which includes a lower roller 78 and an upper roller 80 which engage the opposed surfaces of the web 44 with the upper roller 80 being adjustable by suitable mechanism 82 to vary the roll pressure on the web 44. The speed of the rollers 78 and 80 may be varied but is synchronized with the primary feed and by running slightly ahead of the primary feed, the shear feed will pick up the loop and the shear feed rolls 78 and 80 will slip during the shear time. From the shear feed station 22, the continuous web or strip 44 proceeds to the shear station 24 which includes a shear apparatus 84 operated by a cam mechanism 86 with the shear mechanism 84 being spring returned with the cam mechanism 86 serving to shear the web or strip 44 into a plurality of strip sections 88 of equal length. The drive speed of the cam mechanism 86 is variable thus enabling the length between the shear cuts of the web 44 to be varied thereby adjusting the length of the strip sections.

As the strip sections 88 leave the shear station 24, they are supported by a skid panel 90 having side flanges 92 thereon and holddown panels 94 extending therebetween for engaging the top surface of the strip sections 88 for retaining them in position on the skid panel 90. Also, as the strips 88 are sheared, the free end of the web to be cut into a section first is engaged by the advance feed and sensor for double thickness station 26 which includes a lower roller 96 and an upper roller 98. The lower roller 96 is provided with an overrunning clutch and the roll speed is variable and synchronized with the primary speed. The roll pressure is variable by a suitable mechanism 100 to enable slipping of the rolls during shear time. A sensor element is incorporated with the rollers to detect double strip thickness which serves to operate a scrap throw-out to clear apparatus of imperfect strip sections 88. The overrunning clutch is incorporated to permit acceleration of the strip section travel by the secondary feed station 28 which includes an upper roller 102 and a lower roller 104 with the upper roller 102 being adjustable by an adjusting mechanism 106 to enable variation in the roll pressure for positive pull through advanced speed. The roll speed of the secondary feed is variable and runs ahead of the advanced speed to clear shear area. The location of the secondary feed station 28 is variable and determined by the length of the strip sections 88 by varying the distance from the stop station 32 to the center line of the advance feed.

From the secondary feed station, the strip sections 88 proceed to the kicker station and the stop station 32. Of course, to reach the kicker station, the strip section 88 necessarily passes the strap throw-out station 38. Also, the skid panel 90 continues past the scrap throw-out station 38 into a downwardly curved portion 108. The kicker station and stop station are operated in conjunction with each other and are controlled from a reference point on the adhesive applicator. The kicker station includes a kicker roller 110 rotated at a speed synchronized with the adhesive applicator and a pressure roller 112 moved to contact by a solenoid 114 by a reference point on the adhesive applicator.

The stop station 32 includes a stop plate 116 reciprocally supported on a support plate 118 for projection through a slot 120 in the curved portion 108 with it being noted that the slot 120 is vertically elongated to also enable vertical movement of the stop plate 116. The stop plate 116 is slidably supported by a guide mechanism 122 and reciprocated by a solenoid 124 connected to the plate 116 by a pin 126. The solenoid 124 is operated from the adhesive applicator by the same reference point as the solenoid 114 for the pressure roller 112. The solenoids 114 and 124 are spring biased such that the roller 112 and the stop plate 116 are spring returned to normal position for the following strip section 88.

The support plate 118 for the stop plate 116 is supported by a vertically reciprocated mounting block 128 which is reciprocated on guide members 130 by a cam 132 engaging a cam roller follower 134 rotatably journalled on the block 128 for causing the mounting block 128 to reciprocate during rotation of the cam 132. A spring 136 engages the top surface of the mounting block or slide 128 and urges it downwardly so that the follower 134 will be retained in contact with the surface of the cam 132. The cam 132 lifts or moves to stop assembly vertically for a distance of one-half the space between lines of adhesive applied to the strip sections 88 by the adhesive applicator and dwells for one revolution of applicator thus providing alternate adhesive lines on each succeeding strip section 88. The cam drive speed is variable and synchronized with the applicator speed to provide for proper location of the strip section.

Figure 8:
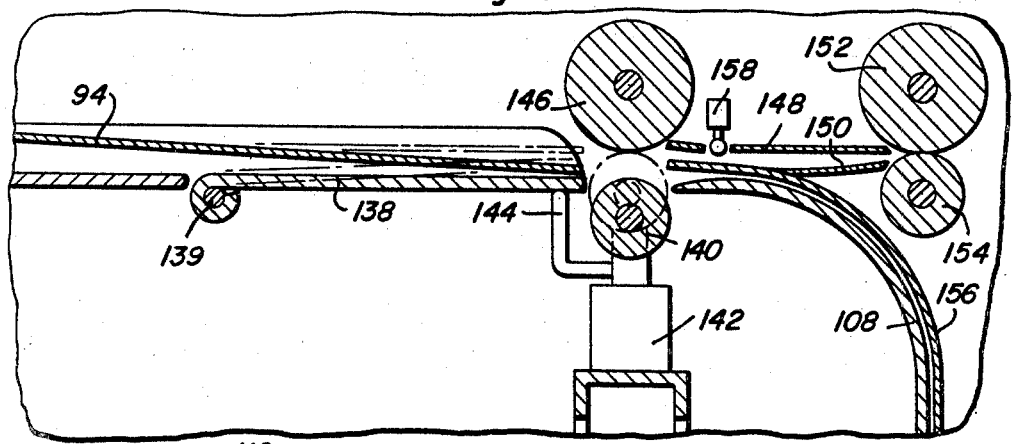
FIGURE 8 is a detailed sectional view illustrating the construction of the scrap throw-out.
Figure 9:
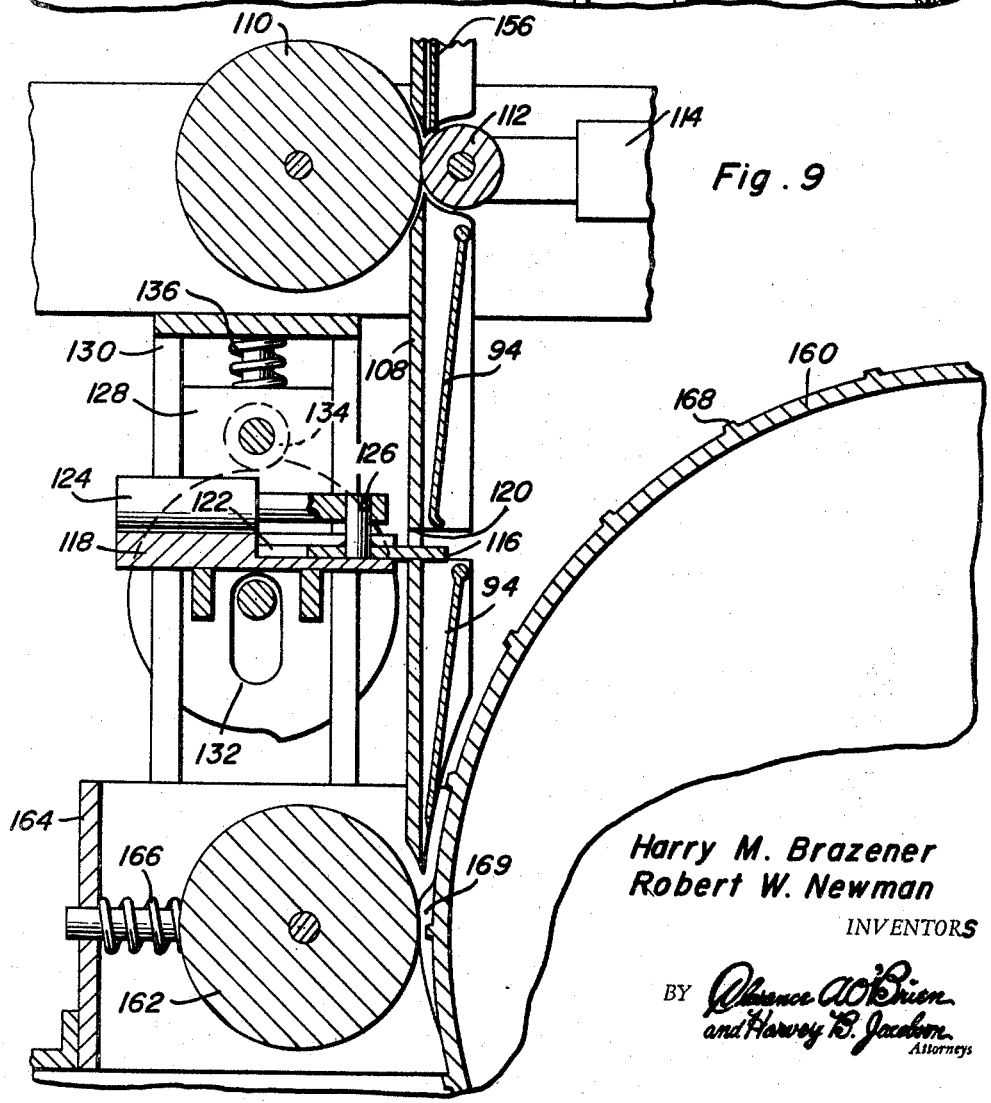
FIGURE 9 is a detailed sectional view illustrating the stop mechanism for the strip and its association with the adhesive applying drum.

The scrap throw-out station 38 includes a skid section 138 which is pivotally supported on a transverse cross shaft 139 which is generally tangent with an elevatable roller 140 supported by a lift mechanism 142 such as a solenoid or the like and an arm 144 extends laterally from the lift mechanism and engages under the skid section 138 to elevate the skid section when the roller 140 is elevated. Disposed above and in alignment with the roller 140 is a top roller 146 generally tangential to a holddown plate 148 which is spaced from a retainer plate 150 which feeds the scrap, strip section between throw-out rollers 152 and 154 with the discharge from the rollers 152 and 154 being to a scrap area. Also, as illustrated in FIGURE 8, there is provided a holddown 156 spaced from the curved downwardly curved portion 108. When the roller 140 is elevated, the strip section is guided above the holddown 156 and below the holddown 148 and a switch with a holding circuit 158 is activated by the strip section for holding the circuit to prevent the dropping of the guide roller 140 before the tail of the strip section being discarded is cleared. The scrap throw-out station works in conjunction with both the tension control station 16 and the advance feed station 26 and specifically the sensing element therein. In case of breakage of the strip or web, the floating roller 54 at the tension control station cuts off the feed at pay-off and activates throw-out. The sensing element at the advance feed station 26 activates the throw-out to eliminate the double thickness. As the lift mechanism 142 is activated, it raises the guide section 138 and the roller 140 to direct the throwaway strip section into the throw-out rollers 152 and 154 which are running slightly ahead of the first set with the throw-out speed being in excess of the secondary feed to clear the apparatus for a succeeding strip or web section 88.

The adhesive applicator station 34 includes an enlarged applicator drum 160 opposed to a back-up roller 162 which is spring mounted on a support structure 164 by a spring assembly 166 with the roller 162 serving to engage one surface of a strip section 88 and holding it against transverse ribs 168 on the applicator drum 160. The applicator drum may be provided with interchangeable sleeves which have desired spacing and widths of ribs 168 or individual and separate replaceable drum units may be employed. In all instances, the outside diameter of the drum must remain the same to maintain synchronization of the strip section feed and application of adhesive. The drum speed of course is variable and is in excess of the secondary feed roll speed and the back-up roll speed is synchronized with the applicator. The back-up roller pressure is variable and the contact with the strip is controlled by a cam 169 on the rim of the drum and is varied according to the length of the strip section passing through to prevent contact of the back-up roller 162 with the applicator drum when no strip section is present thus preventing adhesive from being deposited on back-up roller 162.

The adhesive feed system is of the roll type and includes a transfer roller 170 engaged with the drum 168 and a pick up roller 172 having a portion of the periphery thereof engaged with the transfer roller 170 and a portion of the periphery thereof disposed in a reservoir 174 for picking up adhesive in the reservoir and applying it to the transfer roller 170 for application to the drum 160. The synchronization in the speed of the roller type adhesive feed system is synchronized with that of the applicator and the intermediate roller or transfer roller 170 is adjustable for variable contact with the pick up roller and the drum. Various types of adhesive materials or bonding materials may be employed. If a hot melt material is used, provision is made for heating the reservoir by employing heating elements 176 or the like. Also, the applicator drum 160 may also be heated if the hot melt material is employed. If a thermosetting adhesive is employed, provision is to be made for heat application after pressing such as by using a high frequency heat device.

After the strip section 88 leaves the applicator station 34, it has lines of adhesive 178 thereon and it free falls into the press station 36.

The press station 36 receives the strip sections 88 after they pass the adhesive applicator station 34 and includes a press 37 including a vertically disposed face plate or section 180 which is reciprocated in a horizontal direction between a pair of spaced walls 182 and 184. The walls 182 and 184 are interconnected by a bottom panel 186 at the end thereof adjacent the face plate 180 and a conveyor structure such as a belt-type conveyor 188 forms the bottom of the press and the upper run thereof is in alignment with bottom panel 186 for forming an off bearing conveyor of the assembled core 190 which will be continuous and subsequently expanded and cut into desired lengths. The distance between the walls 182 and 184 may be adjusted in any suitable manner to conform closely with the width of the strip sections 88 which form the core 190. Any suitable follower mechanism (not shown) may be employed for engagement with the first strip of material. However, under normal operating conditions, there will be a quantity of core 190 already formed and the press chamber will not be emptied except in situations where the production has been stopped for some reason. The conveyor 188 extends to a processing area or cut-off area where the core 190 is expanded into a honeycomb core and the skins are applied thereto.

The face plate 180 includes a vertically disposed mounting plate 192 having a plurality of vertically disposed tubular members 194 thereon which are square or rectangular in configuration with each of them being provided with a plurality of vertically disposed apertures 196 which communicate with the surface thereof for vacuum engagement with the surface of the strip section 88 which does not have adhesive thereon. The number of tubular members 194 may be varied so that they are as wide as the strip section 88 and the increase in the number of apertures 196 will correspond with the increase in weight of the wider strip section. The tubular members 194 are communicated with a vacuum pump 198 through a vacuum line 200 so that the controlled vacuum will be applied through the apertures 196 in the face plate to decelerate the strip section 88 as it free falls from the adhesive applicator so that the strip section 88 will not free fall downwardly against the bottom panel 186 which would possibly tend to bend or deform the lower edge thereof.

The mounting plate 192 is supported by vertical reinforcing edge members 202 interconnected by transverse brace members 204. Also, a pair of mounting plates extend across and between the edge reinforcing members 202 with the mounting plates 206 each having a pair of bearing blocks 208 attached thereto for rotatably journalling a transverse roller 210 in the form of a cam follower for a cam member 212 carried by a shaft 214 journalled on bearing blocks 216 which are supported by transverse brace members 218 supported between upstanding support members 220 which are rigidly affixed to the bottom panel 186 by connecting wall members 222 or the like whereby rotation of the shaft 214 will cause rotation of the cams 212 and the followers 210 engaging the cam 212 will cause the mounting plate 192 and the tubular members 194 to be reciprocated between the walls 182 and 184.

For returning the mounting plate 192 to a retracted position, the vertical frame members 202 are provided with a plurality of vertically spaced pairs of rods 224 which extend through suitable apertures in transverse frame members 226 which interconnect the side wall members 222. Also, the rods 224 extend through transverse members 228 which are spaced from the frame members 226 and each of the rods 224 has a compression spring 230 mounted thereon and provided with a retaining nut or cap 232 on the outer end of each rod 224 so that the rods 224 and the members 204 and mounting plate 192 will be spring biased to a retracted position. The cams 212 will, of course, be synchronized in their rotation, then will be synchronized with the adhesive applicator. Disposed above the face plate 180 is a vacuum manifold 234 which is also apertured and communicated with the vacuum hose or conduit 200 with the vacuum manifold 234 serving to form a transition surface between the back-up roller 162 and the inner surface of the face plate 180. The drive speed of the cams 212 is variable and synchronized with the adhesive applicator to make the press and clear the area for a succeeding strip section. The face plate 180 of the press 37 extends into the press box defined by the side walls 182 and 184 and the side walls 182 and 184 guide the strip section and align the strip section for pressing. The strips will be frictionally engaged with the walls 182 and 184 and when there is a quantity of core 190 in the press box, the friction against the walls and the bottom will be adequate to provide a backing surface for operation of the press face plate to provide a bonding pressure. The friction area extends to the conveyor 188 and the conveyor extends to the cut-off or processing area.

The side rails are all adjustable with one side rail or guide generally being fixed and the other side guide being adjustable to various widths. The strip holddowns 94 may be permanently attached and either spring loaded or weighted and may be either the drag or roller type. The feed rollers and all of the rollers having flanges or collars thereon may have one of the collars adjustable with the bottom roll collars aligning the strip and the top roll collars applying pressure preferably at each side and at the strip center. This adjustment and maintenance of the accurate control of the strip position enables the core to be provided with an accurate thickness and substantially a constant thickness throughout its area thus requiring very little sanding or trimming of the core material after it has been formed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. The method of forming an expandible core for use in making a honeycomb core panel consisting of the steps of supplying a continuous web of core material of a predetermined substantially constant width, cutting the continuous web transversely into a plurality of equal length strips, applying bonding material to one surface of each strip at regularly spaced transverse areas along the length thereof, free-fall positioning the strips lengthwise vertically in a sequential manner, pressing the strips together to bond the strips to each other in the areas having the bonding material thereon, and shifting the relative position of sequential strips when bonding material is applied thereto so that the areas of bonding material on sequential strips will be staggered to enable the plurality of bonded strips to be expanded to form a honeycomb core.

2. The method of forming an expandible core for use in making honeycomb core panel consisting of the steps of supplying a continuous web of core material of a predetermined substantially constant width, cutting the continuous web transversely into a plurality of equal length strips, applying bonding material to one surface of each strip at regularly spaced transverse areas along the length thereof, free-fall positioning the strips lengthwise vertically in a sequential manner, pressing the strips together to bond the strips to each other in the areas having the bonding material thereon, and sensing and removing strips of irregular dimensions between the cutting step and the step of applying bonding material to the strips, shifting the relative position of sequential strips when applying bonding material thereto so that the transverse areas of bonding material on sequential strips are staggered, and applying vacuum to the surface of the strip free of bonding material thereby pulling it against a vertical surface to frictionally decelerate the free falling strip.

3. An apparatus for forming a core of a plurality of strips of material comprising a vertically disposed press box having spaced side walls for receiving free falling elongated strips lengthwise and vertically therein, a vertically disposed face plate between said walls at one end thereof, means reciprocating the face plate inwardly and outwardly in relation to the walls for pressing strips against each other for bonding strips together, and vacuum means associated with the face plate for arresting downward movement of the strips during their free fall to decelerate the strips as they enter the press box, an adhesive applicator disposed above the face plate, said applicator including a rotatable cylinder for applying adhesive to one surface of the strip of core material at longitudinally spaced transverse lines, a back-up roller spaced from the adhesive applying cylinder for engaging the surface of the strip opposite to that receiving adhesive material, means stopping each strip of core material for synchronization with the adhesive applicator, and means shifting the position of said stop means for each strip of core material to stagger the position of the lines of adhesive on each strip of core material to enable the assembled strips to be expanded to form a honeycomb core.

4. The structure as defined in claim 3 together with a continuous strip of core material, means cutting the core material into strips of substantially equal length, and means between the cutting means and the adhesive applicator for sensing irregular strips and discharging the irregular strips prior to applying adhesive.

5. The structure as defined in claim 4 wherein said discharging means for irregular strips includes a slider bed supporting the strips during their movement, said slider bed including a movable section to deflect the irregular strips to another path and throw-out rollers receiving the irregular strips from the movable slider bed section for discharging the irregular strips.

6. An apparatus for forming a core of a plurality of strips of material comprising means supplying a plurality of elongated and relatively narrow strips of a constant width and equal length, means applying bonding material on transverse areas on one surface of each strip, means for staggering the positioning of the bonding material on sequential strips, vertically dropping the strips into a press, means decelerating the free falling strips as they enter the press, and means in said press for pressing the strips together into bonded relation.

References Cited

UNITED STATES PATENTS

| | | | |
|---|---|---|---|
| 3,301,729 | 1/1967 | Kauffman | 156—291 XR |
| 3,352,736 | 11/1967 | Kulwicki | 156—350 |
| 3,416,983 | 12/1968 | Steele | 156—197 |
| 3,140,030 | 7/1964 | Stewart | 226—95 |
| 3,257,253 | 6/1966 | Hoyt | 156—256 |

HAROLD ANSHER, Primary Examiner

H. F. EPSTEIN, Assistant Examiner

U.S. Cl. X.R.

156—512, 548